United States Patent
Binzer et al.

(10) Patent No.: US 11,340,347 B2
(45) Date of Patent: May 24, 2022

(54) RADAR SENSOR DEVICE

(71) Applicant: Robert Bosch GmbH, Stuttgart (DE)

(72) Inventors: Thomas Binzer, Ingersheim (DE); Volker Gross, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 307 days.

(21) Appl. No.: 16/377,726

(22) Filed: Apr. 8, 2019

(65) Prior Publication Data
US 2019/0331789 A1 Oct. 31, 2019

(30) Foreign Application Priority Data
Apr. 27, 2018 (DE) .......................... 102018206535.7

(51) Int. Cl.
*G01S 13/931* (2020.01)
*G01S 7/03* (2006.01)
*H01Q 1/32* (2006.01)
*H01Q 21/08* (2006.01)

(52) U.S. Cl.
CPC .............. *G01S 13/931* (2013.01); *G01S 7/03* (2013.01); *G01S 2013/93271* (2020.01); *H01Q 1/3233* (2013.01); *H01Q 21/08* (2013.01)

(58) Field of Classification Search
CPC ..... G01S 7/032; G01S 13/931; H01Q 1/3233; H01Q 21/08; H01Q 21/20
See application file for complete search history.

(56) References Cited

U.S. PATENT DOCUMENTS

| | | | | |
|---|---|---|---|---|
| 4,922,257 A * | 5/1990 | Saito | ..................... | H01Q 3/2676 342/368 |
| 5,008,678 A * | 4/1991 | Herman | ................... | G01S 13/87 342/158 |
| 5,449,591 A * | 9/1995 | Sato | ..................... | H05K 3/0014 430/313 |
| 5,462,838 A * | 10/1995 | Sato | ..................... | H05K 3/0014 430/313 |
| 5,467,072 A * | 11/1995 | Michael | ................ | G01S 13/931 340/436 |
| 5,657,021 A * | 8/1997 | Ehsani-Nategh | ...... | G01S 13/426 342/70 |
| 5,657,024 A * | 8/1997 | Shingyoji | ................ | H01Q 3/24 342/175 |
| 5,764,192 A * | 6/1998 | Fowler | ................... | H01Q 1/281 343/705 |
| 6,667,724 B2 * | 12/2003 | Barnes | ................ | G01S 13/0209 342/27 |
| 9,647,325 B2 * | 5/2017 | Geary | ................... | H01Q 1/3233 |
| 2002/0145570 A1 * | 10/2002 | Barnes | ..................... | H01Q 1/38 343/824 |
| 2006/0022866 A1 * | 2/2006 | Walton | .................... | G01S 7/352 342/194 |
| 2007/0139287 A1 * | 6/2007 | Inomata | ................. | H01Q 13/02 343/786 |

(Continued)

*Primary Examiner* — Peter M Bythrow
(74) *Attorney, Agent, or Firm* — Norton Rose Fulbright US LLP; Gerard Messina

(57) ABSTRACT

A radar sensor device in a motor vehicle, in particular in a car, is provided, the radar sensor device including a plurality of antenna elements which are situated at least partially at different heights, in which the antenna elements are situated at least partially at different distances from a plane which runs perpendicularly to the moving direction of the motor vehicle.

13 Claims, 4 Drawing Sheets

(56) References Cited

U.S. PATENT DOCUMENTS

| | | | |
|---|---|---|---|
| 2009/0207079 A1* | 8/2009 | Samukawa | G01S 13/42 342/378 |
| 2010/0182874 A1* | 7/2010 | Frank | G01S 13/30 367/101 |
| 2011/0050886 A1* | 3/2011 | Thompson | G01S 13/867 348/135 |
| 2011/0074620 A1* | 3/2011 | Wintermantel | H01Q 9/0407 342/70 |
| 2011/0285571 A1* | 11/2011 | Jeong | H01Q 1/3283 342/27 |
| 2012/0320208 A1* | 12/2012 | Hoenes | G01S 15/87 348/148 |
| 2013/0120205 A1* | 5/2013 | Thomson | H01Q 21/064 343/776 |
| 2014/0062762 A1* | 3/2014 | Kurono | G01S 13/88 342/146 |
| 2014/0095010 A1* | 4/2014 | Lange | A01B 69/008 701/26 |
| 2014/0306840 A1* | 10/2014 | Koerber | G01S 7/032 342/107 |
| 2014/0368375 A1* | 12/2014 | Baftiu | G01S 13/931 342/70 |
| 2015/0002329 A1* | 1/2015 | Murad | G01S 7/2813 342/155 |
| 2015/0198705 A1* | 7/2015 | Schoor | G01S 13/424 342/147 |
| 2015/0253419 A1* | 9/2015 | Alland | G01S 13/4463 342/385 |
| 2015/0260836 A1* | 9/2015 | Hayakawa | H01Q 13/206 342/70 |
| 2015/0285904 A1* | 10/2015 | Rao | H01Q 25/00 342/146 |
| 2015/0298635 A1* | 10/2015 | Schondorf | B60R 21/0136 180/274 |
| 2015/0301172 A1* | 10/2015 | Ossowska | G01S 13/878 342/70 |
| 2016/0072191 A1* | 3/2016 | Iwai | H01Q 21/20 343/771 |
| 2016/0209504 A1* | 7/2016 | Stein | G01S 3/44 |
| 2016/0334504 A1* | 11/2016 | Ling | G01S 13/931 |
| 2017/0018844 A1* | 1/2017 | Mayer | H01Q 21/061 |
| 2017/0047649 A1* | 2/2017 | Himmelstoss | H01Q 21/064 |
| 2017/0098888 A1* | 4/2017 | Geary | H01Q 1/3283 |
| 2017/0307744 A1* | 10/2017 | Loesch | G01S 13/003 |
| 2017/0315231 A1* | 11/2017 | Wodrich | G01S 13/87 |
| 2017/0322295 A1* | 11/2017 | Loesch | G01S 13/931 |
| 2017/0329002 A1* | 11/2017 | Koerber | G01S 7/41 |
| 2018/0088230 A1* | 3/2018 | Hung | G01S 13/931 |
| 2018/0151958 A1* | 5/2018 | Lim | H01Q 17/001 |
| 2018/0251092 A1* | 9/2018 | Lee | B60R 21/0132 |
| 2018/0287265 A1* | 10/2018 | Yoshitake | H01Q 5/371 |
| 2018/0321378 A1* | 11/2018 | Sudhakar | G01S 13/343 |
| 2019/0011532 A1* | 1/2019 | Loesch | G01S 13/42 |
| 2019/0086535 A1* | 3/2019 | Meyer | H01Q 13/206 |
| 2019/0195998 A1* | 6/2019 | Campbell | H01Q 1/3233 |
| 2019/0302253 A1* | 10/2019 | Santra | G01S 13/87 |
| 2019/0391230 A1* | 12/2019 | Loesch | H01Q 21/0025 |
| 2020/0241130 A1* | 7/2020 | Lewandowski | G08C 19/00 |

* cited by examiner

RADAR SENSOR DEVICE

RELATED APPLICATION INFORMATION

The present application claims priority to and the benefit of German patent application no. 10 2018 206 535.7, which was filed in Germany on Apr. 27, 2018, the disclosure of which is incorporated herein by reference.

FIELD OF THE INVENTION

The present invention relates to a radar sensor device.

BACKGROUND INFORMATION

Radar systems or radar sensor devices for driver assistance systems have been installed in vehicles for a long time. With the aid of the radar sensor device, distance, velocity, and angle may be detected with regard to objects within the field of vision or radar field of vision. The radar sensor devices used nowadays predominantly have a planar aperture, i.e. the antenna elements are located in one plane. In most cases, the antenna elements are implemented in the form of patch antenna elements.

FIG. 6 shows a radar sensor device according to the related art. The radar sensor device in motor vehicle 40' or pick-up has a field of vision 30' which does not detect an object 50' in the form of a traffic bollard directly in front of vehicle 40' due to unfavorable circumstances.

Planar antennas are usually configured in such a way that the boresight is in 0° elevation, i.e. along the horizontal, and has a narrow lobe in the vertical. This allows for a great range. It is disadvantageous in this case that under unfavorable circumstances, objects which are located close to the ground in direct proximity of the vehicle or motor vehicle 40' are outside the field of vision of the radar sensor device.

SUMMARY OF THE INVENTION

Specific embodiments of the present invention may advantageously make it possible to provide a radar sensor device in the case of which objects may be reliably detected which are located close to the ground in direct proximity of the motor vehicle.

According to a first aspect of the present invention, a radar sensor device in a motor vehicle, in particular in a car, is provided, the radar sensor device including a plurality of antenna elements which are situated at least partially at different heights, characterized in that the antenna elements are situated at least partially at different distances from a plane which runs perpendicularly to the moving direction of the motor vehicle.

It is advantageous in this case that it is possible to reliably detect objects which are usually technically simple and which are located close to the ground in direct proximity of the motor vehicle and/or have a low height. It is also advantageous that the radar sensor device generally has a greater visual range, thus eliminating the need for additional transceiver channels and/or additional antenna elements. The greater visual range in elevation, i.e. in height, generally does not have a significant influence on the azimuthal field of vision and has no influence on the azimuth estimation, if the different distances of the antenna elements from a plane only apply in the elevation plane, i.e. along the height. Moreover, the radar sensor device generally essentially does not have any "blind spots".

The height may run in particular perpendicularly to the surface on which the motor vehicle is moving. The motor vehicle may be a motor vehicle, in particular, which moves or drives in a semi-autonomous or a fully autonomous manner. The motor vehicle may be a passenger car, a truck, an SUV, a bus, a motorcycle, a motor scooter, a boat, or the like.

The plane may run in particular perpendicularly to the surface of the road or the ground, or the plane on which the motor vehicle is moving.

Ideas for specific embodiments of the present invention may be considered to be based, inter alia, on the thoughts and findings described in the following.

According to one specific embodiment, the antenna elements are situated at least partially at different distances from the plane running perpendicularly to the moving direction of the motor vehicle in such a way that the antenna elements are situated at least partially along an arc. It is advantageous in this case that the radar sensor device is thus capable of reliably determining the angle of the objects with regard to elevation or height across a large area.

According to one specific embodiment, the antenna elements are situated along a straight line at least partially equidistantly from the plane running perpendicularly to the moving direction of the motor vehicle, the antenna elements situated along the straight line being located above the antenna elements which are not situated along the straight line. Due to the fact that the antenna elements are only partially not situated on or along the straight line (for example an arc) and partially along a straight line, the field of vision or the visual range of the radar sensor device is generally expanded only in one direction, namely in the direction of the roadway surface or the ground, while the field of vision is not expanded in the other direction upwards or towards the sky, where an expanded field of vision generally does not provide any additional information. In this way, the energy available to the radar sensor device is directed particularly well to areas in which objects may be present.

According to one specific embodiment, the majority, in particular at least 75%, of the antenna elements of the radar sensor device are situated along the straight line equidistantly from the plane running perpendicularly to the moving direction of the motor vehicle. One advantage here is that the radar sensor device is usually configured in a technically particularly simple manner.

According to one specific embodiment, the plurality of the antenna elements includes at least eight, in particular at least ten, antenna elements. One advantage here is that the beam of the radar sensor device may be focused particularly well.

According to one specific embodiment, the difference in the distance of the antenna elements from the plane running perpendicularly to the moving direction of the motor vehicle is maximally as great as 0.3 times the wavelength of the transmit signals of the radar sensor device. This is advantageous in that the radar sensor device may be usually configured to be particularly compact. Consequently, the radar sensor device generally requires particularly little space.

According to one specific embodiment, all antenna elements of the radar sensor device are situated along the arc. One advantage here is that the radar sensor device is generally configured in a technically particularly simple manner.

According to one specific embodiment, the arc has a radius which corresponds to 10 times the wavelength of the transmit signals of the radar sensor device. This makes it possible to detect objects in a generally technically particularly reliable manner. In addition, the angle resolution across the entire visual range is generally particularly good.

According to one specific embodiment, the antenna elements are situated in the vehicle in such a way that an angle range of up to approximately −40°, in particular an angle range of up to approximately −30°, in relation to the horizontal is covered by the medium height of the radar sensor device. It is thus ensured that objects which have a very low height and which are located close to the front side of the motor vehicle are usually also detected by the radar sensor device. In particular, objects which are situated obliquely below or in front of the front side of the motor vehicle have a negative angle with regard to the horizontal due to the medium height of the radar sensor device.

According to one specific embodiment, the antenna elements are situated in the motor vehicle in such a way that the height difference between the uppermost antenna element and the lowermost antenna element corresponds maximally to approximately 10 times, in particular maximally to approximately 6 times, the wavelength of the transmit signals of the radar sensor device. This is advantageous in this case in that the radar sensor device is configured to be generally particularly compact in the height direction, so that it requires only little space.

It is pointed out that some of the possible features and advantages of the present invention are described herein with reference to different specific embodiments. Those skilled in the art recognize that the features of the radar sensor device may be combined, adapted, or exchanged in a suitable manner in order to obtain other specific embodiments of the present invention.

Specific embodiments of the present invention are described in the following with reference to the attached drawings, while neither the drawings nor the description are to be understood as limiting to the present invention.

The figures are only schematic and not true to scale. In the figures, identical reference numerals identify identical features or features having an identical effect.

DETAILED DESCRIPTION

Figure 1:
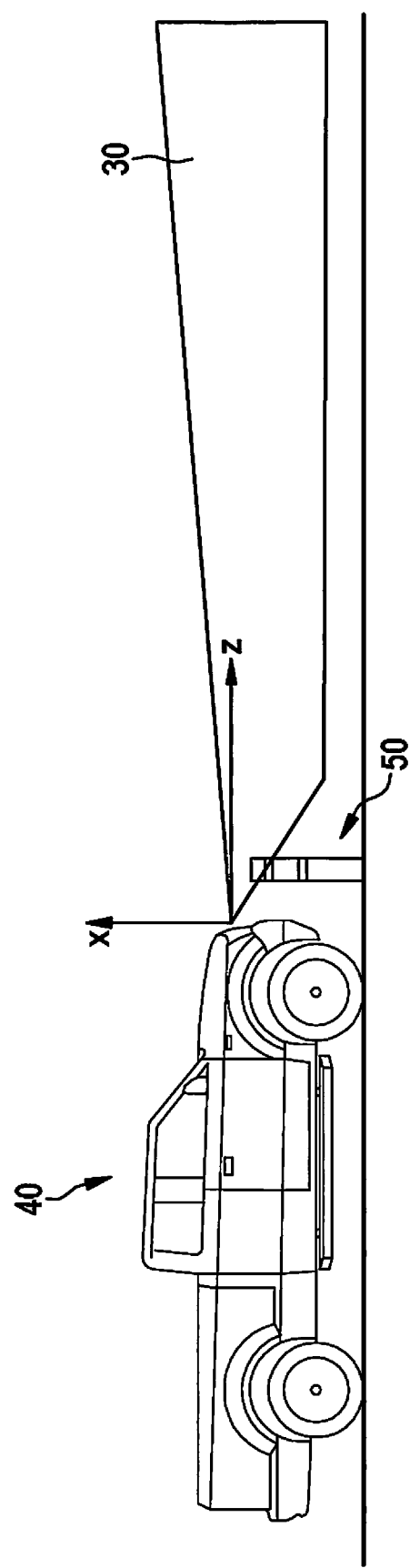
FIG. 1 shows a schematic view of a motor vehicle including one specific embodiment of the radar sensor device according to the present invention.
Figure 2:
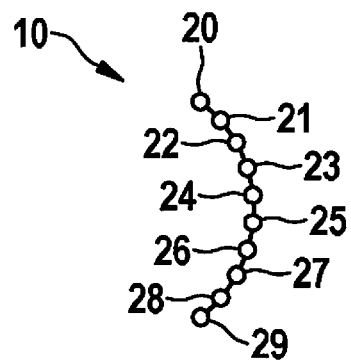
FIG. 2 shows a part of the radar sensor device from FIG. 1.
Figure 3:
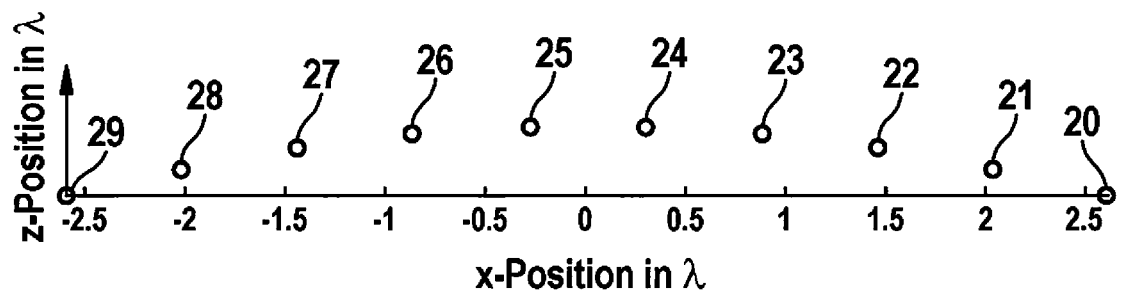
FIG. 3 shows the arrangement of the antenna elements in the radar sensor device from FIG. 1 and FIG. 2.

FIG. 1 shows a schematic view of a motor vehicle 40 including one specific embodiment of radar sensor device 10 according to the present invention. FIG. 2 shows a part of radar sensor device 10 from FIG. 1. FIG. 3 shows the arrangement of antenna elements 20 through 29 in radar sensor device 10 from FIG. 1 and FIG. 2.

Radar sensor device 10 includes a plurality of antenna elements 20 through 29. Antenna elements 20 through 29 may be situated on a shared circuit board. For example, each of antenna elements 20 through 29 includes one patch antenna element. Each of the patch antenna elements may, for example, include an etched structure made of metal for transmitting and receiving radar signals on a circuit board.

Figure 4:
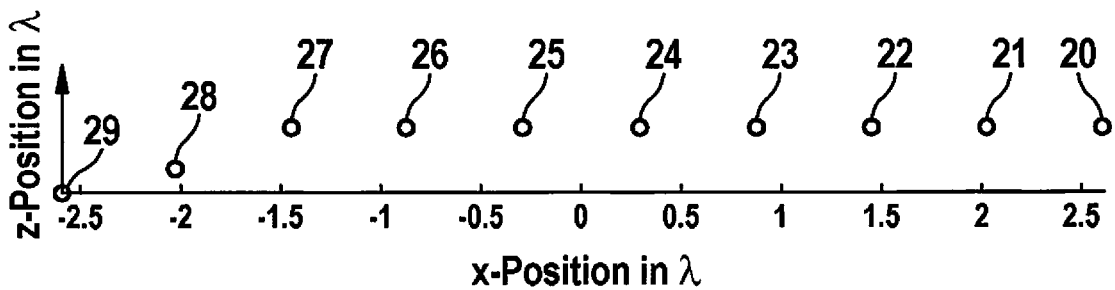
FIG. 4 shows an arrangement of the antenna elements in another specific embodiment of the radar sensor device according to the present invention.

In FIG. 1, FIG. 3, and FIG. 4, the z axis runs along or in parallel to the moving direction of motor vehicle 40 and thus in parallel to the surface of the road or the ground. The x axis, which is perpendicular to the z axis, runs in the height direction, i.e. perpendicularly to the surface of the road or of the ground on which motor vehicle 40 is standing or moving.

In FIG. 3 and FIG. 4, the values on the x axis are identified as multiples of the wavelength of the transmit signals of the radar sensor device.

Radar sensor device 10 is situated in motor vehicle 40 or installed therein, for example, in the front section of motor vehicle 40. Radar sensor device 10 is situated in such a way that antenna elements 20 through 29 are situated at different heights.

Antenna elements 20 through 29 may be situated equidistantly from one another in the height direction, i.e. along the x axis. It is also possible that antenna elements 20 through 29 or a part of antenna elements 20 through 29 are/is spaced apart from one another at different distances.

The radar sensor device has a so-called conformal antenna aperture, i.e. not all antenna elements 20 through 29 are situated along a straight line. In other words, this means that not all antenna elements 20 through 29 of radar sensor device 10 have the same distance from a plane which runs perpendicularly to the moving direction of motor vehicle 40. This plane runs perpendicularly to the surface of the road or the ground. This means that in FIG. 1, this plane runs from top to bottom and perpendicularly to the drawing plane. In FIG. 3 and FIG. 4, this plane runs horizontally.

A part of antenna elements 20 through 29 is situated along an arc. This is apparent particularly well in FIG. 3. The arrangement on an arc means, in particular, that antenna elements 20 through 29 with increasing height of particular antenna element 20 through 29 (i.e. from left to right in FIG. 3) are initially always situated further to the front in motor vehicle 40 (greater or higher value on the z axis) and starting from 6th antenna element 24 from the left-hand side in FIG. 3 further back in motor vehicle 40 (lower or smaller value on the z axis). Antenna elements 20 through 29 may be symmetrically situated along a plane which runs through the 0 value on the x axis in FIG. 3.

The radius of the arc may, for example, be 10 times the wavelength (λ) of the transmit signals of radar sensor device 10. Other values are conceivable.

As a result of the arc-shaped arrangement in the elevation direction or in the height direction, which is shown in FIG. 3, field of vision 30 of radar sensor device 10 is expanded upwards (away from the surface of the ground) and downwards (toward the surface of the ground). In this way, the angle range which is covered by radar sensor device 10 is expanded to include values of up to approximately −40° in relation to a horizontal. As a result, objects 50 which are very close in front of the vehicle and/or have a low height, for example approximately 1 m or approximately 50 cm, are reliably detected. For example, object 50 in the form of a traffic bollard in FIG. 1 is detected by the radar sensor device according to the present invention, although object 50 is located very close to the motor vehicle, for example less than 1 m or less than 50 cm, and has a low height.

In particular, objects 50 may also be detected with the aid of radar sensor device 10 which are not visually perceivable by the driver under certain circumstances due to the high front area of motor vehicle 40, for example in the case of a pick-up, such as the one shown in FIG. 1, or an SUV or a truck.

The medium height of radar sensor device 10 runs horizontally through the center of FIG. 2.

Figure 5:
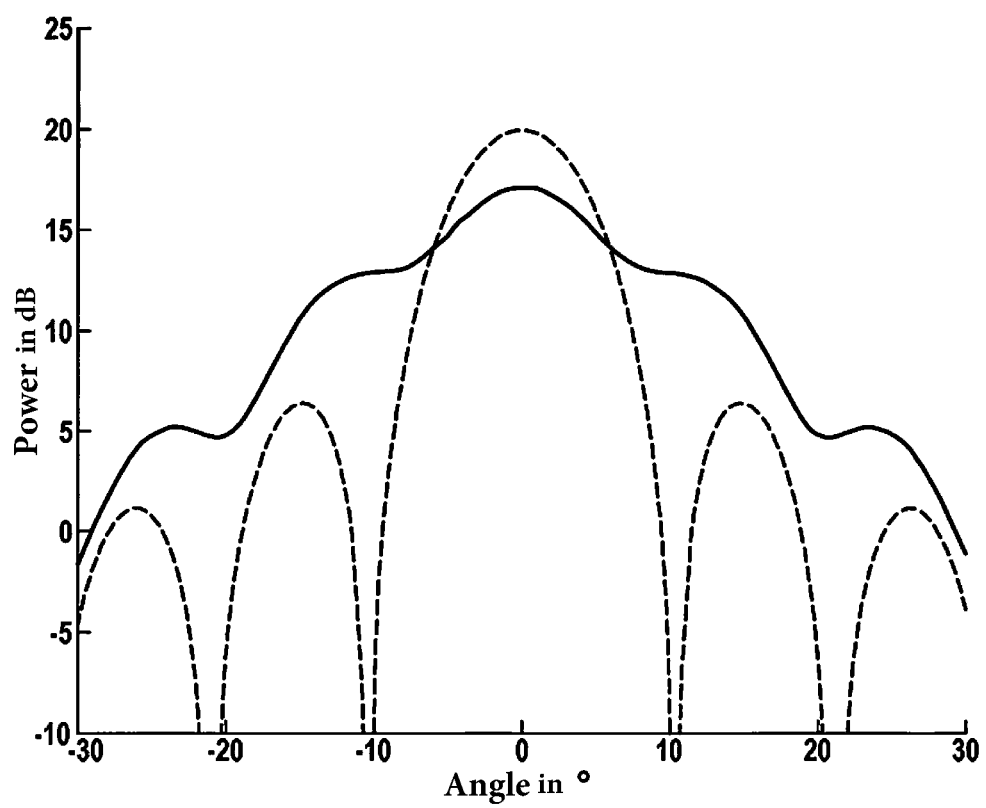
FIG. 5 shows a diagram of a directional characteristic of the radar sensor device from FIG. 2 and a radar sensor device according to the related art.
Figure 6:
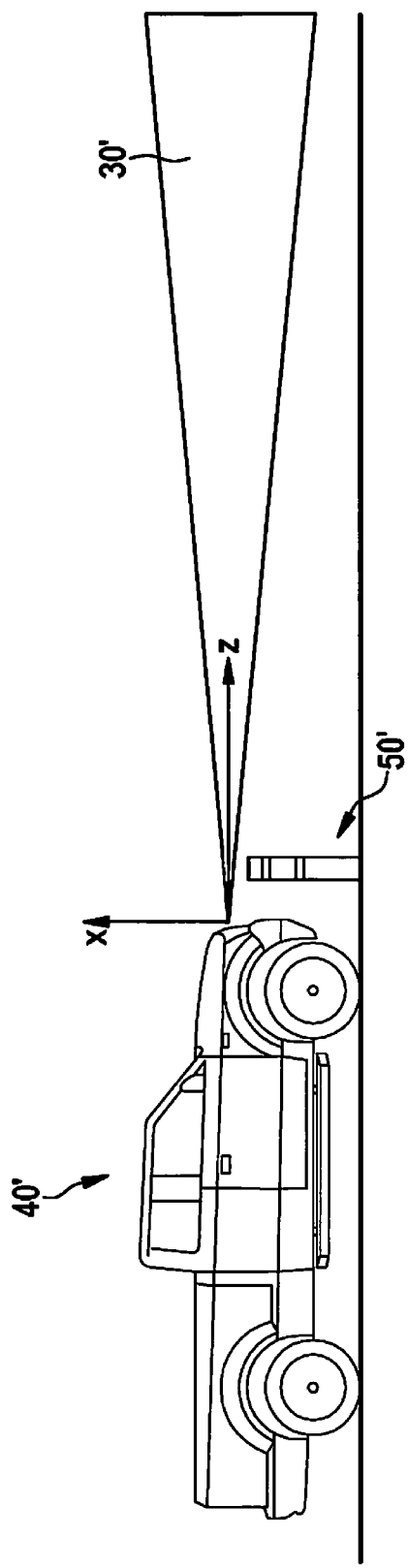
FIG. 6 shows a schematic view of a motor vehicle including a radar sensor device according to the related art.

FIG. 5 shows a diagram of a directional characteristic of radar sensor device 10 from FIG. 2 and a radar sensor device 10 according to the related art. The directional characteristic for radar sensor device 10 according to the related art is shown in FIG. 5 as a dashed line, while the directional characteristic for radar sensor device 10 according to the present invention is illustrated in FIG. 5 as a solid line.

As is apparent in FIG. 5, in the case of radar sensor device 10 according to the present invention, there are essentially no angle ranges within field of vision 30 in which present objects 50 cannot be detected by radar sensor device 10 in contrast to radar sensor device 10 according to the related art. There are essentially no so-called "blind spots".

Radar sensor device 10 thus has a wide field of vision 30 in elevation or height and a narrow field of vision 30 as well as a relatively wide range in azimuth or width at the same time. The azimuth runs perpendicularly to the drawing plane of FIG. 1.

The expanded visual range in elevation has no influence on azimuthal field of vision 30 and no influence on the azimuth estimation, since the curvature of the arrangement of antenna elements 20 through 29 exists solely in the elevation plane.

In addition to antenna elements 20 through 29 shown in FIG. 2, radar sensor device 10 may include further elements for generating the transmit signals and for processing the received signals. Radar sensor device 10 may also include an analysis unit for analyzing the received signals or data.

Antenna elements 20 through 29 which are perceivable further to the right-hand side in FIG. 3 are each situated above antenna elements 20 through 29 which are perceivable further to the left-hand side in FIG. 3.

The arc runs in a plane which runs perpendicularly to the roadway or road and in parallel to the moving direction of motor vehicle 40.

FIG. 4 shows an arrangement of antenna elements 20 through 29 in another specific embodiment of radar sensor device 10 according to the present invention. In this specific embodiment, a part, namely the upper part, of antenna elements 20 through 29 is situated on a straight line. The other part of antenna elements 20 through 29, namely the lower part, is situated on an arc which connects to the straight line in a correspondingly suited manner, so that the arc transitions into the straight line without any kinks or the like.

The two left-hand antenna elements 20 through 29 are situated on an arc. The remaining eight antenna elements 20 through 29 of radar sensor device 10 are each spaced at the same distance from a plane which runs perpendicularly to the moving direction of motor vehicle 40.

It is also conceivable that antenna elements 20 through 29 are situated sectionally in a planar manner or on a straight line. This means that several antenna elements 20 through 29 are spaced at the same first distance from the plane which runs perpendicularly to the moving direction of motor vehicle 40 and several antenna elements 20 through 29 are spaced at the same second distance from the plane which runs perpendicularly to the moving direction of motor vehicle 40, the first distance being different from the second distance. Further antenna elements 20 through 29 may be spaced at a third distance from the plane which runs perpendicularly to the moving direction of motor vehicle 40, the third distance being different from the first distance and the second distance or only from the first distance or only from the second distance.

Radar sensor device 10 may be situated in the forward moving direction of motor vehicle 40, as is shown in FIG. 1. It is also conceivable that alternatively or additionally, a radar sensor device 10 is situated in the backward moving direction, i.e., on the rear side of motor vehicle 40.

The difference in the distance from the plane running perpendicularly to the moving direction of motor vehicle 40 may be, for example, maximally as great as 0.3 times the wavelength of the transmit signals of radar sensor device 10. In the case of a usual wavelength of the transmit signals, the maximum difference of antenna elements 20 through 29 from the plane running perpendicularly to the moving direction of motor vehicle 40 is thus in the range from approximately 1 mm to approximately 2 mm, for example 1.5 mm.

In FIG. 1, the moving direction of motor vehicle 40 runs from left to right or from right to left.

In this way, a motor vehicle 40 including a radar sensor device 10 described here is explicitly provided.

With the aid of radar sensor device 10, radar signals are emitted and reflections of objects 50 in the surroundings of motor vehicle 40 are received. The reflections on objects 50 received as radar signals may be used to determine the velocity, the position and/or the angle of object 50 or objects 50 in relation to motor vehicle 40, more precisely in relation to the radar sensor device.

Finally, it is to be pointed out that terms such as "having", "including", etc. do not exclude any other elements or steps and terms such as "a" or "an" do not exclude a plurality. Reference numerals in the claims are not to be considered as limitations.

What is claimed is:

1. A radar sensor device in a motor vehicle, comprising:
a plurality of antenna elements, arranged in the radar sensor device, which are situated at least partially at different heights;
wherein the antenna elements are situated at least partially at different distances from a plane which runs perpendicularly to the moving direction of the motor vehicle,
wherein the antenna elements, in the radar device, are situated at least partially at different distances from the plane running perpendicularly to the moving direction of the motor vehicle so that at least some of the antenna elements are situated in an arc shaped arrangement along an arc,
wherein the arc shaped arrangement defines an arc having a radius which is a multiple of a wavelength of a transmit signal of the radar sensor device, wherein the arc lies in a plane which runs perpendicularly to the surface of the ground and in parallel to the moving direction of the motor vehicle, wherein the antenna elements are arranged along the arc such that an elevation angular range of the radar sensor device is increased, wherein the antenna elements situated in the arc shaped arrangement are configured such that objects, which are in front of the vehicle or have a low height and which are not visually perceivable by the driver, are detectable.

2. The radar sensor device of claim 1, wherein the antenna elements are situated along a straight line at least partially equidistantly from the plane running perpendicularly to the moving direction of the motor vehicle, and wherein the antenna elements situated along the straight line are located above the antenna elements which are not situated along the straight line.

3. The radar sensor device of claim 2, wherein the majority of the antenna elements of the radar sensor device is situated along the straight line equidistantly from the plane running perpendicularly to the moving direction of the motor vehicle.

4. The radar sensor device of claim 1, wherein the plurality of the antenna elements includes at least eight antenna elements.

5. The radar sensor device of claim 1, wherein the difference in the distance of the antenna elements from the plane running perpendicularly to the moving direction of the motor vehicle is maximally as great as 0.3 times the wavelength of the transmitted signals of the radar sensor device.

6. The radar sensor device of claim 1, wherein the arc has a radius which corresponds to 10 times the wavelength of the transmitted signals of the radar sensor device.

7. The radar sensor device of claim 1, wherein the antenna elements are situated in the vehicle so that an angle range of up to approximately −40° in relation to the horizontal is covered by a medium height of the radar sensor device.

8. The radar sensor device of claim 1, wherein the antenna elements are situated in the motor vehicle so that the height difference between the uppermost antenna element and the lowermost antenna element corresponds maximally to approximately 10 times the wavelength of the transmitted signals of the radar sensor device.

9. The radar sensor device of claim 1, wherein the motor vehicle includes a car.

10. The radar sensor device of claim 2, wherein at least 75% of the antenna elements of the radar sensor device is situated along the straight line equidistantly from the plane running perpendicularly to the moving direction of the motor vehicle.

11. The radar sensor device of claim 1, wherein the plurality of the antenna elements includes at least ten antenna elements.

12. The radar sensor device of claim 1, wherein the antenna elements are situated in the vehicle so that an angle range of up to approximately −30° in relation to the horizontal is covered by a medium height of the radar sensor device.

13. The radar sensor device of claim 1, wherein the antenna elements are situated in the motor vehicle so that the height difference between the uppermost antenna element and the lowermost antenna element corresponds maximally to approximately 6 times the wavelength of the transmitted signals of the radar sensor device.

\* \* \* \* \*